United States Patent [19]
Wanderscheid et al.

[11] Patent Number: 5,897,285
[45] Date of Patent: *Apr. 27, 1999

[54] LOW PROFILE LOADING RAMP

[75] Inventors: Steve Wanderscheid, Boyden, Iowa; Louis E. Stumpp, Jr., Pittsboro, Ind.

[73] Assignees: Dethmers Manufacturing Company, Boyden, Iowa; Ryder Truck Rental, Inc., Miami, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/585,401

[22] Filed: Jan. 11, 1996

[51] Int. Cl.$^6$ ....................................................... B60D 1/43
[52] U.S. Cl. ............................................. 414/537; 14/69.5
[58] Field of Search ................................... 414/537, 538, 414/522, 569; 14/69.5, 71.1, 72.5; 244/137.1; 296/183, 181, 182, 37.1, 37.6, 97.5

[56] References Cited

U.S. PATENT DOCUMENTS

| | | |
|---|---|---|
| 3,511,393 | 5/1970 | Abromavage et al. . |
| 3,517,791 | 6/1970 | Miles ..................................... 14/69.5 X |
| 3,559,826 | 2/1971 | Abromavage et al. . |
| 3,713,662 | 1/1973 | Abromavage et al. . |
| 4,198,187 | 4/1980 | Mountz . |
| 4,242,032 | 12/1980 | Whiteman et al. . |
| 4,685,857 | 8/1987 | Goeser et al. ....................... 414/537 X |
| 4,722,109 | 2/1988 | Mountz . |
| 4,838,605 | 6/1989 | Abromavage . |
| 4,845,808 | 7/1989 | Millar et al. . |
| 4,900,217 | 2/1990 | Nelson ................................... 414/537 |
| 4,929,018 | 5/1990 | Curty . |
| 4,941,703 | 7/1990 | Curry . |
| 5,022,697 | 6/1991 | Hettwer . |
| 5,133,634 | 7/1992 | Gingrich et al. . |
| 5,199,150 | 4/1993 | Mortenson . |
| 5,253,410 | 10/1993 | Mortenson . |
| 5,340,267 | 8/1994 | Stoll et al. . |
| 5,467,855 | 11/1995 | Sorensen .............................. 414/537 X |

FOREIGN PATENT DOCUMENTS

| 708711 | 5/1965 | Canada ................................... 14/69.5 |

OTHER PUBLICATIONS

"Demco Truck Ramps" Brochure of Dethmers Manufacturing Company believed to be printed May, 1992.

Primary Examiner—Frank E. Werner
Attorney, Agent, or Firm—Brian J. Laurenzo; Michael C. Gilchrist

[57] ABSTRACT

A cargo truck is provided having a loading ramp assembly to aid in loading and unloading items from a cargo box on the truck. The loading ramp assembly is adjustable between a loading position wherein a ramp is provided between a deck of the cargo box and the ground, and a storage position to allow transport of the cargo truck. The loading ramp fits within a pocket between the truck frame and the cargo box when in the storage position. The pocket is formed by long C-shaped box sills that support the cargo box. The ramp is formed by two side rails, a ramp floor between the side rails, and support braces between the ramp floor and the side rails to prevent buckling of the side rails upon application of a load to the ramp. The braces extend below the bottom of the box sills when the ramp is in a storage position. The braces allow for lower profile side rails, thereby reducing the amount the cargo box must be raised above the truck frame to accommodate the ramp assembly. The cargo box has cross members which set directly on the box sills without the need to be cut.

24 Claims, 7 Drawing Sheets

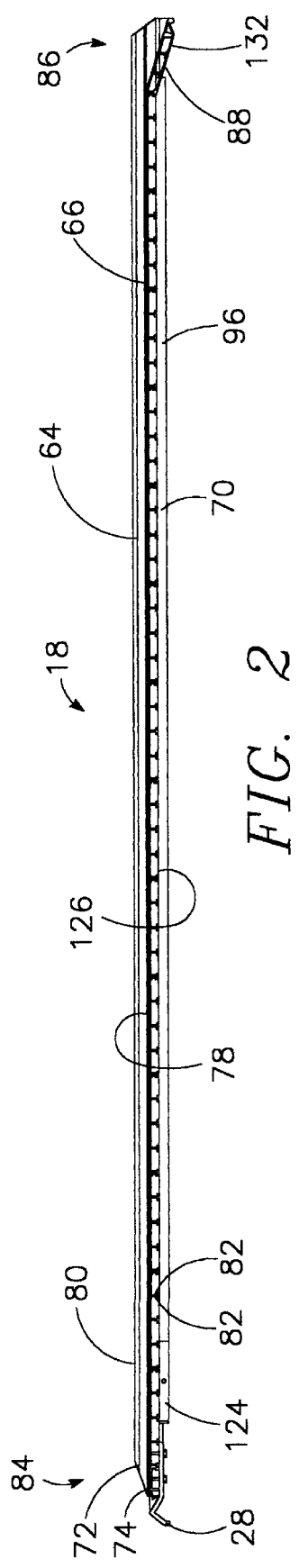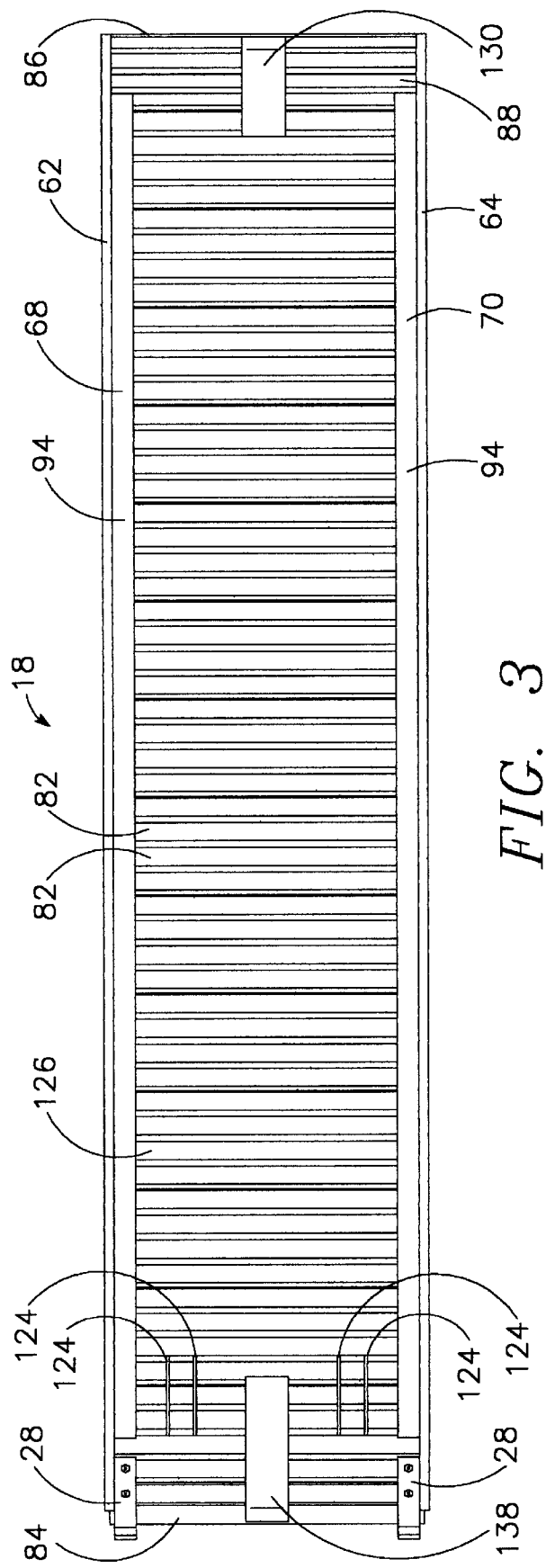

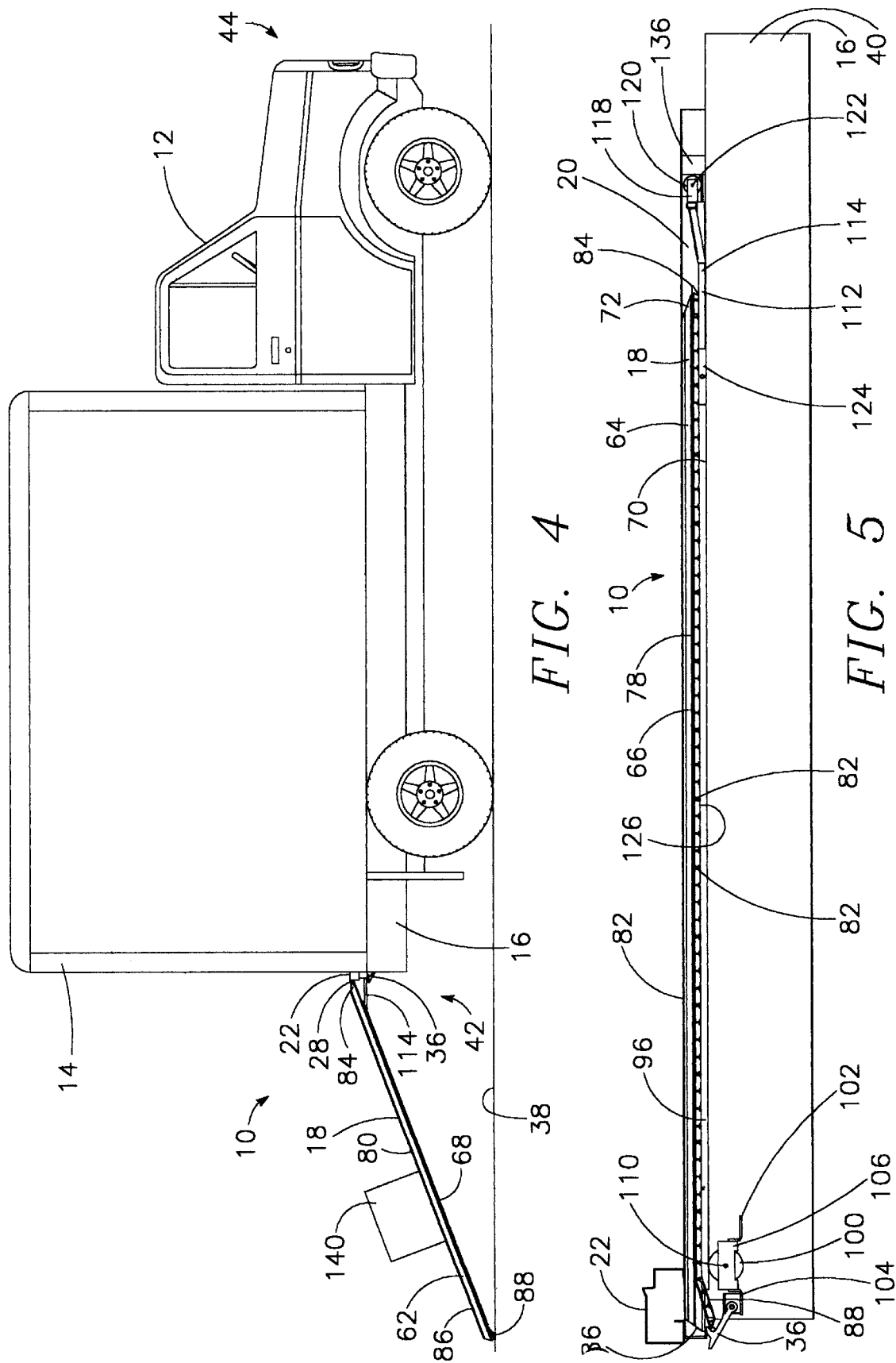

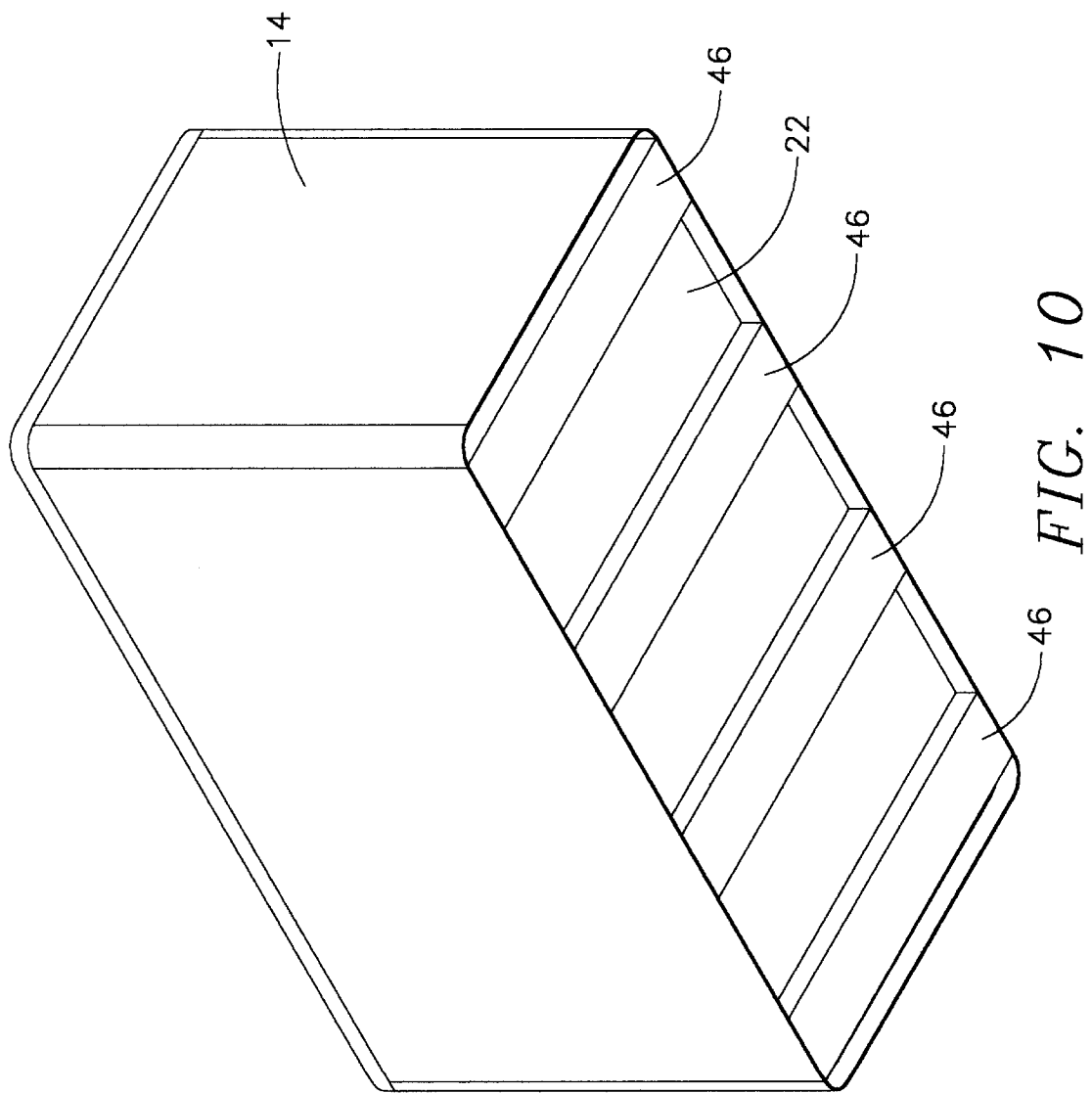

LOW PROFILE LOADING RAMP

BACKGROUND OF THE INVENTION

The present invention relates generally to loading ramp assemblies and cargo trucks having loading ramps, and more particularly a loading ramp which has low profile side rails for convenient storage between the cargo box and the truck frame of a cargo truck.

Cargo trucks having loading ramps are well-known in the art. One typical design for the ramps is to provide two long C-shaped sills between the frame of the truck and the cargo box. The sills are mounted so that the legs of the sills are facing each other. The ramp fits within the sills. The ramp itself consists of horizontal cross members which form the ramp floor between two side rails. To move the ramp to a loading position, an operator pulls the ramp out the back of the truck until it is free from the sill. Typically there is some means provided to hook the front end of the ramp to the deck of the cargo box.

Generally, past designs have effectively allowed for the storage of the ramp on the truck and have been sufficient to aid in the loading and unloading of the cargo box. However, some problems do exist with the ramps disclosed in the prior art. The side rails were required to be of a large height in order to have sufficient structural modulus to prevent excessive deflection or collapse of the ramp upon the application of a load during loading and unloading. This high profile of the side rails means that the ramp takes up a lot of space during storage. Typically this space was created by raising the floor of the cargo box. A raised cargo box can be undesirable because it can be more difficult to load, can cause increased wind drag during transportation, can raise the center of gravity, and can cause clearance problems at the top of the box.

Also, because of the height of the side rails, the deck of the cargo box was typically set directly on to the long sills. This meant that the cross members that supported the deck had to be terminated at the sills. This created three different cross members out of a single cross member that went all the way across, thereby weakening the deck. It also meant that the ramp assembly could only be used with specially adapted cargo boxes, without raising the floor of the cargo box. The difficulties encountered in the prior art discussed above are substantially overcome by the present invention.

SUMMARY OF THE INVENTION

Accordingly, it is an object of the present invention to provide a loading ramp suitable for storage between a truck frame and a cargo box.

It is an object of the present invention to provide a loading ramp that has low profile rails.

It is another object of the present invention to provide a loading ramp assembly that can be used with a variety of cargo boxes without the need to cut the cross-member supports of the cargo box.

It is yet another object of the present invention to provide a loading ramp assembly that reduces the amount the deck of the cargo box must be raised above the frame of the truck.

It is an object of the present invention to provide a cargo truck with a self-contained ramp which fits between the truck frame and the cargo box of the truck.

By the present invention, it is proposed to overcome the difficulties encountered heretofore. To this end, a loading ramp assembly is proposed having low profile side rails for storage between a truck frame and a cargo box of a cargo truck. A ramp floor runs between and is supported by a first side rail and a second side rail substantially parallel to the first side rail. In order to support the side rails against deflection upon application of a load to the ramp floor, a first brace is provided under the ramp floor in connection between the first side rail and the ramp floor, and a similar second brace is provided between the second side rail and the ramp floor. In preferred embodiments, a first and second box sill are provided between the truck frame and the cargo box to contain and support the loading ramp when in a storage position. The box sills are attached to the cargo box such that the loading ramp, the box sills and the cargo box can be removed from the truck frame as a unit. The truck frame has two frame members. The outside edge of the side rails is wider than the inside width of the truck frame members, but the braces extend inside the width of the truck frame members. A portion of the braces extends below the box sills when the ramp is in the storage position. To aid in moving the ramp between the storage position and a loading position, a carriage is attached to a front end of the ramp, the carriage having wheels that ride within the sills. Also, rollers are mounted to the truck frame. The braces bear on the rollers when moving between the storage position and the loading position. The cargo box has a deck supported by cross members, the entire ramp assembly fits below the lowest surface of these cross members so that there is no need to cut the cross member to mount the cargo box on the box sills.

BRIEF DESCRIPTION OF THE DRAWINGS

FIG. 2 is a cut-away side view of the ramp;

FIG. 3 is a bottom view of the ramp;

FIG. 4 is a cut-away side view of the ramp assembly and cargo truck, with the ramp in a loading position;

FIG. 5 is a cut-away side view of the ramp and truck frame with the ramp in a storage position;

FIG. 10 is a perspective view of the cargo box.

Figure 1:
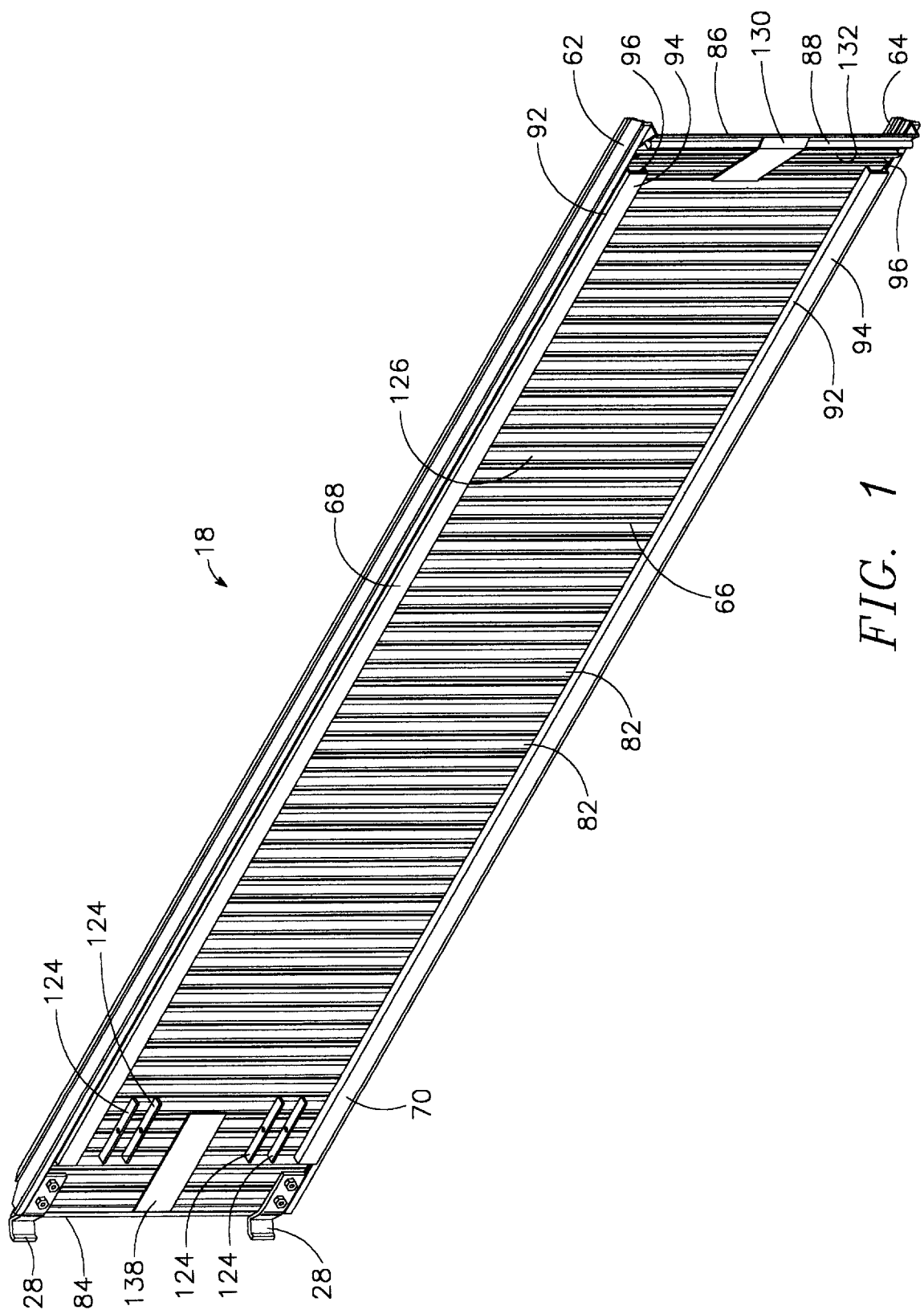
FIG. 1 is a perspective view of the ramp.

DETAILED DESCRIPTION OF THE PREFERRED EMBODIMENTS shown generally in the figures is a low profile loading ramp assembly 10 that stores on a cargo truck 12 between the cargo box 14 and the truck frame 16. A loading ramp 18 moves in the assembly 10 between a loading position (FIG. 4) and a storage position (FIG. 5). When the ramp 18 is in the loading position it provides a ramp between the ground 38 and the deck 22 of the cargo box 14 to aid in loading and unloading cargo from the cargo box 14. When the ramp 18 is in the storage position, it fits within a pocket 20 between the cargo box 14 and the truck frame 16. The ramp 18 is moved from the storage position to the loading position by disengaging a latch 36 and pulling on handles 24 until the ramp 18 is fully extended. The front end 84 of the ramp 18 is then pulled upwardly and forwardly and hooks 28 are engaged with slots 30 near the deck 22 to hold the ramp 18 in place. The ramp 18 is moved from the loading position back to the storage position by disengaging the hooks 28 from the slots 30, and lifting the rear end 86 of the ramp 18. The ramp 18 is then pushed forward into the pocket 20 until the latch 36 catches the ramp 18.

As seen in FIG. 4, the cargo truck 12 of the preferred embodiment is of the type typically used by consumers and commercial businesses to move appliances, furniture, and like-cargo. The cargo is placed into the cargo box 14 which is operably connected to the truck frame 16. The truck 12 is then used to transport the cargo. A ramp 18 between the deck 22 of the cargo box 14 and the ground 38 aids in loading and unloading the cargo by allowing wheeled dollies or carts to be used.

Typical truck frames 16 have two frame members 40 running longitudinally from an area proximate to the rear 42 of the truck 12 towards the front 44 of the truck 12. A cargo box 14 is mounted on the truck frame 16. Most cargo boxes have cross-members 46 which support the deck 22 of the cargo box 14 (FIG. 10). When the cargo box 14 is mounted on the truck frame 16, these cross-members 46 run perpendicularly to the frame members 40. Typically the frame members are parallel to each other. The distance between the inside edges 98 of the truck frame members 40 is the minimum inside width of the truck frame 16. A common design is to mount a ramp assembly between the truck frame 16 and the cargo box 14. This requires raising the cargo box 14 somewhat above the truck frame 16. In order to minimize the amount the cargo box 14 must be lifted, current designs require that the cross-members 46 be cut to make space for the ramp assembly 10. The present design eliminates the need to cut the cross-members 146, while still maintaining a relatively low height of the deck 22 of the cargo box 14 above the truck frame 16.

The ramp assembly 10 of the present invention is adaptable to fit on a variety of truck frames 16. Further, because of the low profile of the ramp of the present invention, the cross-members 46 of the cargo box 14 can be mounted directly on the ramp assembly 10 without being cut and without substantially raising the cargo box 14. This means that the deck 22 of the cargo box 14 is fully supported, there is no need to waste time and energy modifing the cargo box 14 to fit the ramp assembly 10, and the ramp assembly 10 is compatible with a wide variety of cargo boxes.

Figure 6:
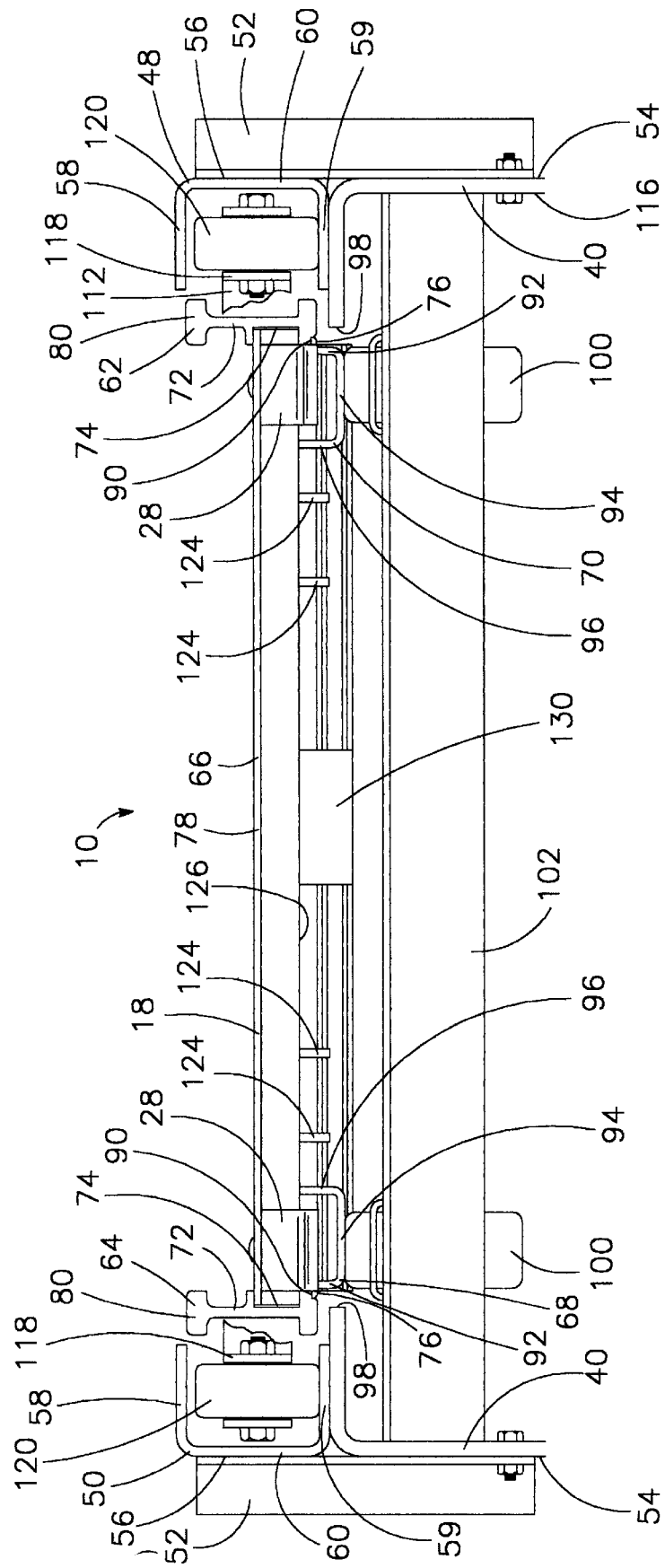
FIG. 6 is a front view of the ramp assembly and truck frame, with the ramp in a storage position.

The pocket 20 into which the loading ramp 18 fits when in the storage position is formed by a first box sill 48 and a second box sill 50 (FIG. 6). The box sills 48, 50 are mirror images of each other. They are C-shaped elongated channels. The box sills 48, 50 are mounted on the frame members 40 facing each other, one each of the two frame members 40. In the preferred embodiment they are mounted by bolting mounting angles 52 to the outside face 54 of the frame S5 members 40, and welding the mounting angles 52 to the outside 56 of the respective box sills 48, 50. By unbolting the angles 52 from the truck frame 16, the cargo box 14, the box sills 48, 50, and the ramp 18 can be removed from the truck frame 16 as a unit. It is contemplated that other means would be suitable for mounting the box sills 48, 50 to the frame 16. The box sills 48, 50 should be made of a material strong enough to support the weight of the cargo box 14 and any cargo that might be placed in the cargo box 14. In the preferred embodiment the box sills 48, 50 are made of 0.187 inch thick steel. The legs 58 of the box sills 48, 50 are two inches long, and the body 60 of each box sill 48, 50 is three inches high.

Figure 7:
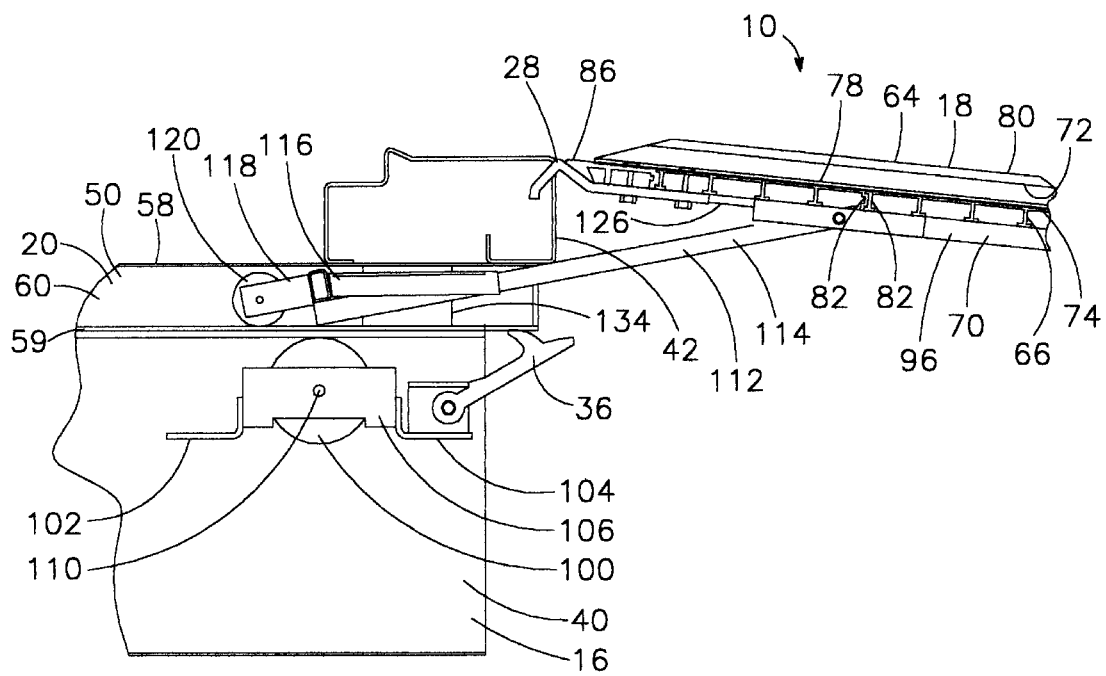
FIG. 7 is a partial side view of the ramp assembly and truck frame, with the ramp pulled out of the storage position.

The loading ramp 18 comprises a first side rail 62 and a second side rail 64, a ramp floor 66, and a first brace 68 and a second brace 70 (FIG. 1). The side rails 62, 64 are made of extruded aluminum and are mirror images of each other. The side rails 62, 64 appear as modified I-beams in cross-section, having a curb section 72 which extends above the ramp floor 66, a floor retaining section 74 which anchors the ramp floor 66 to the side rails 62, 64, and a brace notch 76 for receipt of the braces 68, 70. In the preferred embodiment the side rails are 2.56 inches in height. The surface 78 of the ramp floor 66 is approximately 1.42 inches from the top surface 80 of the side rails 62, 64. The distance between the top surface 80 of the side rails and the surface 78 of the ramp floor 66 is known as the "curb height." The curb section 72 serves as a guard rail on the side of the loading ramp 18 to help prevent dollies from rolling off, and to help prevent feet from slipping off, the sides of the ramp 18 during loading and unloading. Each side rail 62, 64 is 137.125 inches long. In order that they will not extend significantly above the deck 22 of the cargo box 14 when in the loading position, each side rail 62, 64 has its top corner removed at the front 84 of the ramp 18 (FIG. 7).

The ramp floor 66 is comprised of interlocking strips 82 of aluminum extrusion. The strips 82 run between the side rails 62, 64 and are perpendicular to the side rails 62, 64. The interlocking strips 82 are 28.25 inches long and extend 0.42 inches into each floor retaining section 74 of the side rail, leaving a usable ramp width of no less than 27.41 inches and preferably at least 27.5 inches. The strips 82 are strong enough to support the weight of typical loads 140 that might be brought up the ramp 18 without buckling across the width of the ramp 18. However, because they are perpendicular to the side rails, the strips 82 do not add much strength to prevent deflection or buckling of the side rails 62, 64 between the ground 38 and the deck 22 of the cargo box 14. Near the rear 86 of the ramp 18, an entrance section 88 of strips 82 is provided (FIG. 2). The entrance section 88 is sloped downward, so that the ramp floor 66 will contact the ground 38 when the ramp is in the loading position without the need to extend the ramp floor 66 beyond the end of the side rails 62, 64.

The braces 68, 70 provide support to the side rails 62, 64 to help prevent excessive deflection or buckling by the side rails 62, 64 when a load 140 is applied to the ramp 18. In prior art ramp assemblies the side rails had a higher profile and therefore had a sufficient structural modulus to prevent buckling without bracing. By shrinking the height of the rail, and placing a brace inside the rail, between the rail and the ramp floor, an overall lower profile for the assembly is achieved.

The braces 68, 70 are elongated 0.125 inch thick aluminum channels that run parallel to the side rails 62, 64 for almost the entire length of the ramp 18. The first brace 68 is welded to the first side rail 62 and the ramp floor 66. The second brace 70 is welded to the second side rail 64 and the ramp floor 66 (FIG. 2). When viewed in cross-section, the braces 68, 70 are shaped like a question mark turned on its side (FIG. 6). Each brace 68, 70 has a horizontal lip 90, a short vertical leg 92 extending below the lip 90, a channel bottom 94 extending from the short vertical leg 92, and a long vertical leg 96 extending above the channel bottom 94. As can be seen in FIG. 6, the horizontal lip 90 is received within the brace notch 76 of a side rail 62. The horizontal lip 90 extends far enough from the rail 62, 64 that the short vertical leg 92 is inside an inside edge 98 of the truck frame member 40. There is generally a small amount of space inside the inside edge of the truck frame members, and below the top surface of the truck frame members that is empty. By extending the vertical legs 92, 96 of the braces 68, 70 inside of the inside edge 98 of the truck frame members 40, the horizontal lip 90 allows this empty space, plus the space directly above it that corresponds to the thickness of the bottom legs 58 of the box sills 48 to be utilized for increasing the structural modulus of the ramp 18 against buckling and excessive deflection. By using this space, the amount the cargo box 14 needs to be raised to allow for the ramp assembly 10 is reduced.

Near the rear of the truck frame, rollers 100 are mounted to aid in moving the ramp 18 between the storage position and the loading position (FIG. 7). In the preferred embodiment a front cross angle 102 and a rear cross angle 104 are mounted between the truck frame members 40. As can best be seen in FIG. 9, the rollers 100 are mounted on mounting plates 106 that are welded between the cross angles 102, 104. The rollers 100 are rotatably mounted between the mounting plates 106 by bolts 110 passing through the mounting plates 106 and the rollers 100. Bushings 108 are also provided to reduce friction. These bushings 108 are wider than the rollers 100 so that the bolts 110 can be tightened and still allow the rollers 100 to rotate. In the preferred embodiment, the rollers 100 are 3.437 inches in diameter.

As shown in FIG. 6, the rollers 100 bear on the braces 68, 70. Because the braces hang below the level of the top of the frame members, the rollers 100 are fully contained below the top of the frame members. This means that different style cargo boxes can still be used on a truck frame which has the rollers mounted on it, even if the cargo box mounts directly on the truck frame.

Figure 9:
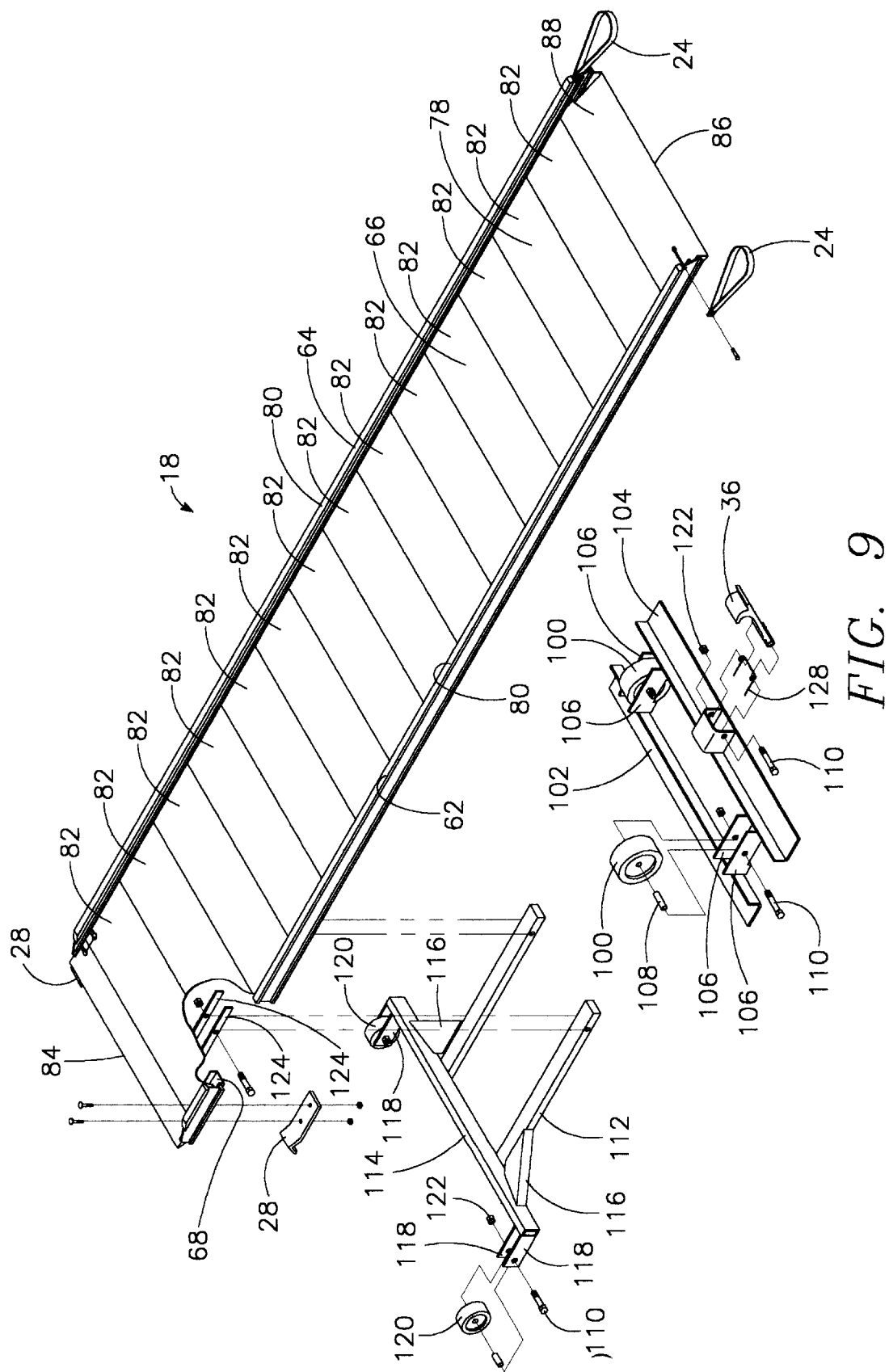
FIG. 9 is an exploded view of the ramp, the roller, and the carriage.

A carriage 112 is connected to the front of the ramp 18 (FIG. 9). The carriage 112 comprises a frame 114 shaped like the Greek letter pi, two support webs 116, wheel brackets 118, two wheels 120, and two bolts 110, nuts 122, and bushings 108. The carriage frame 114 is pivotally connected to carriage mounting plates 124 which are welded to the underside 126 of the ramp floor 66. It is important to mount the wheels 120 on to the wheel brackets 118 with the head of the bolt 110 facing outward, so that the head of the bolt 110 can serve as a guide when moving the ramp 18 from the loading position into the box sills 48, 50. The wheels 120 ride on the bottom legs 59 of the box sills 48, 50. Rear wheel stops 134 and front wheel stops 136 are welded into the box sills 48, 50 to prevent the ramp 18 from rolling out of the box sills 48, 50 to the rear, or too far forward.

The rear cross angle 104 is equipped with the latch 36 (FIG. 7). The latch is biased towards a latching position by a torsion spring 128. When the ramp 18 and carriage 112 are slid forward in the box sills 48, 50 to the storage position, the latch 36 catches on the entrance section 88 of the ramp floor 66. To release the latch 36, the latch 36 is pulled downward and rearward until it is clear from the ramp floor 66, and the ramp 18 is pulled rearward. A latch slide plate 130 on the underside 132 of the entrance section 88 of the ramp floor 66 allows the latch 36 to slide across the underside 132 of the entrance section 88 without catching on the contours of the interlocking strips 82 (FIG. 3).

Figure 8:
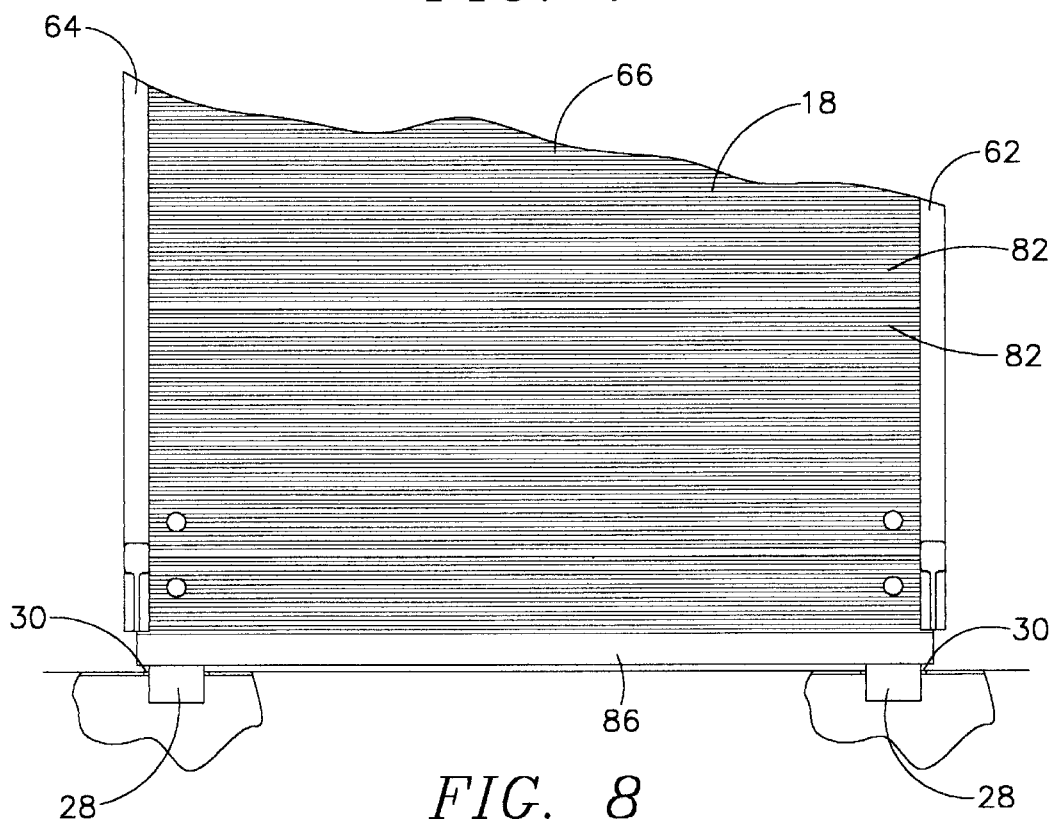
FIG. 8 is a partial plan view of the ramp assembly in a loading position.

To move the ramp 18 from the storage position to the loading position, the latch 36 is released, and the handles 24 are used to pull the ramp 18 rearward. The ramp 18 is pulled until the wheels 120 are stopped in the box sills 48, 50 by rear wheel stops 134 (FIG. 7). The rear 86 of the ramp 18 is then lowered to the ground 38. The front 84 of the ramp 18 is then lifted upward and forward, and the hooks 28 are secured in the slots 30 near the deck 22 of the cargo box 14 (FIG. 8). The rear 86 of the ramp 18 is then lifted off the ground 38 to make sure the hooks 28 are securely in place. The rear 86 of the ramp 18 is set back on the ground 38, and the loading ramp 18 is in the loading position.

To move the ramp 18 back to the storage position, hooks 28 are released from the slots 30 by lifting the front 84 of the ramp 18 and lowering the ramp 18 on to the carriage frame 114. The front of the ramp 18 is then fed into the pocket 20. The rear 86 of the ramp 18 is lifted by the handles 24, and the ramp 18 is slowly pushed forward into the pocket 20. A front skid plate 138 prevents the latch 36 from snagging on the contours of the underside 126 of the ramp floor 66 as the ramp 18 enters the pocket 20 (FIG. 3). The rollers 100 bearing on the braces 68, 70 and the wheels 120 in the box sills 48, 50 aid in sliding the ramp 18 into the pocket 20. The ramp 18 is pushed forward until the latch 36 catches on the entrance section 88 of the ramp floor 66. The ramp 18 is prevented from being pushed too far forward by front wheel stops 136. Once the latch 36 catches the entrance section 88 of the ramp floor 66, the ramp 18 is in a storage position, and the truck 12 can be moved.

By placing braces 68, 70 on the side rails 62, 64, between the side rails 62, 64 and the underside 126 of the ramp floor 66 the present invention allows for lower profile side rails 62, 64. By shaping the braces 68, 70 so that they extend below the box sills 48, 50, even more space has been saved. No part of the ramp assembly 10 extends above the box sills 48, 50 when the ramp is in the storage position. These features allow the cross members 46 of the cargo box 14 to set directly on the box sills 48, 50 without being cut, and without significantly raising the cargo box 14 above the truck frame 16.

Although the invention has been described with respect to a preferred embodiment, it is also to be understood that it is not limited to the preferred embodiment, since changes and modifications can be made therein which are still within the full intended scope of this invention as defined by the claims. For example, while the preferred embodiment shows aluminum side rails and ramp floor, other material could be substituted and still fall within the intended scope of the claims.

What is claimed is:

1. A low profile loading ramp assembly for storage between a truck frame and a cargo box of a cargo truck, the ramp assembly comprising:

a. a first side rail;

b. a second side rail substantially parallel to said first side rail;

c. a ramp floor running between and supported by said first and second side rails, said ramp floor having a top surface and an underside surface;

d. each of said side rails having a curb portion extending above said ramp floor for retaining loads on said ramp floor and a lower portion below said curb portion extending at least partially below said ramp floor;

e. a first brace under said floor and in direct connection between said underside surface of said floor and said lower portion of said first side rail, said first brace providing support to said first side rail against deflection upon application of a load to said ramp floor; and f. a second brace under said floor and in direct connection between said underside surface of said floor and said lower portion of said second side rail, said second brace providing support to said second side rail against deflection upon application of a load to said ramp floor; said side rails, said floor, and said braced forming a loading ramp.

2. The loading ramp assembly according to claim 1, further comprising a first box sill and a second box sill between the truck frame and the cargo box to contain and support the loading ramp when the ramp is in a storage position.

3. The loading ramp assembly according to claim 2, wherein said box sills are attached to the cargo box such that said loading ramp, said box sills, and the cargo box can be removed from the truck frame as a unit.

4. The loading ramp assembly according to claim 2, wherein:
   a. said truck frame has a minimum inside width;
   b. said side rails have an outside edge, and wherein said outside edge of said first rail is at a distance from said outside edge of said second rail greater than said minimum inside width of said truck frame; and
   c. wherein said first brace and said second brace have inside edges, and said inside edge of said first brace is at a distance from said inside edge of said second brace less than said minimum inside width of said truck frame.

5. The ramp assembly according to claim 4, wherein a portion of said first brace and a portion of said second brace extend below said first and second sills when said ramp is in a storage position.

6. The ramp assembly according to claim 2, further comprising a carriage attached to a front end of said ramp, said carriage having rollers which ride within said sills to aid in moving said ramp between said storage position and a loading position.

7. The ramp assembly according to claim 2, wherein none of said ramp extends above a top surface of said sills when said ramp is in a storage position.

8. The loading ramp assembly according to claim 1, further comprising:
   a. a first roller attached to the truck frame to aid in moving the ramp between a storage position and a loading position, said first roller bearing on said first brace; and
   b. a second roller attached to the truck frame to aid in moving the ramp between a storage position and a loading position, said second roller bearing on said second brace.

9. The ramp assembly according to claim 1, wherein the cargo box has a deck supported by cross members, and wherein the entire ramp assembly fits below a lowest surface of the cross members when said ramp is in a storage position.

10. The loading ramp assembly according to claim 9, wherein:
   a. said first brace is an elongated channel that has a cross-section having a lip extending substantially horizontally from said first side rail, a short vertical leg extending substantially perpendicularly below said lip, a horizontal channel bottom extending from said short vertical leg, and a long vertical leg extending from said channel bottom to said underside surface of said ramp floor; and
   b. said second brace is an elongated channel that has a cross-section having a lip extending substantially horizontally from said second side rail, a short vertical leg extending substantially perpendicularly below said lip, a horizontal channel bottom extending from said short vertical leg, and a long vertical leg extending from said channel bottom to said underside surface of said ramp floor.

11. A low profile loading ramp assembly for storage between a truck frame and a cargo box of a cargo truck, the cargo box having cross members which support a deck of cargo box, wherein the entire ramp assembly fits below a lowest surface of the cross members, the ramp assembly comprising:
   a. a first side rail having an outside edge;
   b. a second side rail having an outside edge substantially parallel to said outside edge of said first side rail, said outside edges being farther apart than a minimum inside width of the truck frame;
   c. a ramp floor formed by a plurality of strips running between and supported by said first and second side rails such that said side rails each have a curb portion extending above a top surface of said ramp floor for retaining loads on said ramp floor and such that said side rails each have a lower portion extending below an underside surface of same ramp floor, said strips being substantially perpendicular to said side rails;
   d. a first brace under said ramp floor and in direct connection between said underside surface of said ramp floor and said lower portion of said first side rail, said brace providing support to said first side rail against deflection upon application of a load to said ramp floor, said first brace being a channel with a cross-section having a lip extending substantially horizontally from said lower portion of said first side rail, a short vertical leg extending substantially perpendicularly below said lip, said short vertical leg being inside said minimum inside width of the truck frame, a horizontal channel bottom extending from said short vertical leg, at least of portion of said horizontal channel bottom being below said box sills when said ramp is in said storage position, and a long vertical leg extending from said channel bottom to said underside surface of same ramp floor;
   e. a second brace under said ramp floor and in direct connection between said underside surface of said ramp floor and said lower portion of said second side rail, said brace providing support to said second side rail against deflection upon application of a load to said ramp floor, said second brace being a channel with a cross-section having a lip extending substantially horizontally from said lower portion of said second side rail, a short vertical leg extending substantially perpendicularly below said lip, said short vertical leg being inside said minimum inside width of the truck frame, a horizontal channel bottom extending from said short vertical leg, at least of portion of said horizontal channel bottom being below said box sills when said ramp is in said storage position, and a long vertical leg extending from said channel bottom to said underside surface of said ramp floor; said side rails, said floor, and said braces forming a loading ramp;
   f. a pair of C-shaped box sills between the truck frame and the cross members to contain and support said loading ramp when said loading ramp is in a storage position, said box sills being attached to the cross members such that said loading ramp, said box sills, and the cargo box can be removed from the truck frame as a unit;
   g. a carriage attached to a front end of said loading ramp; said carriage having rollers which side within said box sills to aid in moving said ramp between said storage position and a loading position;
   h. a first roller attached to the truck frame to aid in moving said ramp between said storage position and said loading position, said first roller bearing on said first brace; and i. a second roller attached to the truck frame to aid in moving said ramp between said storage position and said loading position, said second roller bearing on said second brace.

12. The ramp assembly according to claim 11, wherein said box sills are no more than 3.25 inches in height, said ramp floor is at least 138 inches in length, and said side rails have a curb height of at least 1.375 inches above said ramp floor.

13. A cargo truck for hauling items to be loaded onto and off the truck, said truck comprising:
 a. a truck frame;
 b. a loading ramp assembly attached to and supported by said truck frame to aid in loading and unloading the items, said loading ramp assembly including a first side rail, a second side rail, a floor running between said side rails, said floor having a top surface and an underside surface, said side rails each having a curb portion extending above said top surface of said floor for retain the items on said ramp during loading and unloading and a lower portion extending below said underside surface of said floor, a first brace below said floor and in direct connection between said lower portion of said first side rail and said underside surface of said floor to provide stiffness to said first side rail against deflection upon application of a load to said floor, and a second brace below said floor and in direct connection between said lower portion of second side rail and said underside surface of said floor to provide stiffness to said second side rail against deflection upon application of a load to said floor, said side rails, said floor and said braces forming a ramp; and
 c. a cargo box attached to and supported by said loading ramp assembly for containing the items during transport.

14. The cargo truck according to claim 13, wherein said loading ramp assembly further comprises a first box sill and a second box sill between said truck frame and said cargo box to contain and support said ramp when said ramp is in a storage position, and to support said cargo box.

15. The cargo truck according to claim 14, wherein said box sills are attached to said cargo box such that said cargo box and said loading ramp assembly are suitable for removal from the cargo truck as a unit.

16. The cargo truck according to claim 14, wherein:
 a. said truck frame has a minimum inside width;
 b. said side rails each have an outside edge, and wherein said outside edge of said first rail is at a distance from said outside edge of said second rail greater than said minimum inside width; and
 c. said first brace and said second brace have inside edges, and said inside edge of said first brace is at a distance from said inside edge of said second brace less than said minimum inside width of said truck frame.

17. The cargo truck according to claims 16, wherein a portion of said first brace and a portion of said second brace extend below said first and second sills when said ramp is in said storage position.

18. The cargo truck according to claim 14, further comprising a carriage attached to a front end of said ramp, said carriage having rollers which ride within said sills to aid in moving said ramp between said storage position and a loading position.

19. The cargo truck according to claim 14, wherein none of said ramp extends above a top surface of said sills when said ramp is in said storage position.

20. The cargo truck according to claim 13, further comprising:
 a. a first roller attached to said truck frame to aid in moving said ramp between a storage position and a loading position, said first roller bearing on said first brace; and
 b. a second roller attached to said truck frame to aid in moving said ramp between a storage position and a loading position, said second roller bearing on said second brace.

21. The cargo truck according to claim 13, wherein said cargo box has a deck supported by cross members, and wherein said ramp assembly fits entirely below a lowest surface of said cross members when said ramp is in a storage position.

22. The cargo truck according to claim 21, wherein:
 a. said first brace is an elongated channel that has a cross-section having a lip extending substantially horizontally from said first side rail, a short vertical leg extending substantially perpendicularly below said lip, a horizontal channel bottom extending from said short vertical leg, and a long vertical leg extending from said channel bottom to said underside surface of said ramp floor; and
 b. said second brace is an elongated channel that has a cross-section having a lip extending substantially horizontally from said second side rail, a short vertical leg extending substantially perpendicularly below said lip, a horizontal channel bottom extending from said short vertical leg, and a long vertical leg extending from said channel bottom to said underside surface of said ramp floor.

23. A cargo truck for hauling items to be loaded onto and off the truck, said truck comprising:
 a. a truck frame;
 b. a first side rail having an outside edge;
 c. a second side rail having an outside edge substantially parallel to said outside edge of said first side rail, said outside edges being farther apart than a minimum inside width of the truck frame;
 d. a ramp floor formed by a plurality of strips running between and supported by said first and second side rails such that said side rails each have a curb section extending above a top surface of said ramp floor for retaining loads on said ramp floor and such that said side rails each have a lower portion extending below an underside surface of said ramp floor, said strips being substantially perpendicular to said side rails;
 e. a first brace under said ramp floor and in direct connection between said underside surface of said ramp floor and said lower portion of said first side rail, said brace providing support to said first side rail against deflection upon application of a load to said ramp floor, said first brace being a channel with a cross-section having a lip extending substantially horizontally from said lower portion of said first side rail, a short vertical ramp is in a storage position, said box sills being attached to the cross members such that said loading ramp, said box sills, and the cargo box can be removed from the truck frame as a unit; leg extending substantially perpendicularly below said lip, said short vertical leg being inside said minimum inside width of the truck frame, a horizontal channel bottom extending from said short vertical leg, at least of portion of said horizontal channel bottom being below said box sills when said ramp is in said storage position, and a long vertical leg extending from said channel bottom to said underside surface of said ramp floor;

f. a second brace under said ramp floor and in connection between said underside surface of said ramp floor and said lower portion of said second side rail, said brace providing support to said second side rail against deflection upon application of a load to said ramp floor, said second brace being a channel with a cross-section having a lip extending substantially horizontally from said lower portion of said second side rail, a short vertical leg extending substantially perpendicularly below said lip, said short vertical leg being inside said minimum inside width of the truck frame, a horizontal channel bottom extending from said short vertical leg, at least of portion of said horizontal channel bottom being below said box sills when said ramp is in said storage position, and a long vertical leg extending from said channel bottom to said underside surface of said ramp floor; said side rails, said floor, and said braces forming a loading ramp;

g. a pair of C-shaped box sills between the truck frame and the cross members to contain and support said loading ramp when said loading ramp is in storage position, said box sills being attached to the cross members such that said loading ramp, said box sills, and the cargo box can be removed from the truck frame as a unit;

h. a carriage attached to a front end of said loading ramp, said carriage having rollers which ride within said box sills to aid in moving said ramp between said storage position and a loading position;

i. a first roller attached to the truck frame to aid in moving said ramp between said storage position and said loading position, said first roller bearing on said first brace;

j. a second roller attached to the truck frame to aid in moving said ramp between said storage position and said loading position, said second roller bearing on said second brace; and k. a cargo box having cross members which support a deck of said cargo box, said cargo box being supported by said box sills, and said box sills fitting below a lowest surface of said cross members when said loading ramp is in said storage position.

24. The cargo truck according to claim 23, wherein said sills are no more than 3.25 inches in height, said ramp floor is at least 138 inches in length, and said side rails have a curb height of at least 1.375 inches above said ramp floor.

\* \* \* \* \*